E. C. FAUST.
AUTOMOBILE TRACTOR ATTACHMENT.
APPLICATION FILED APR. 29, 1918.
1,292,286.
Patented Jan. 21, 1919.
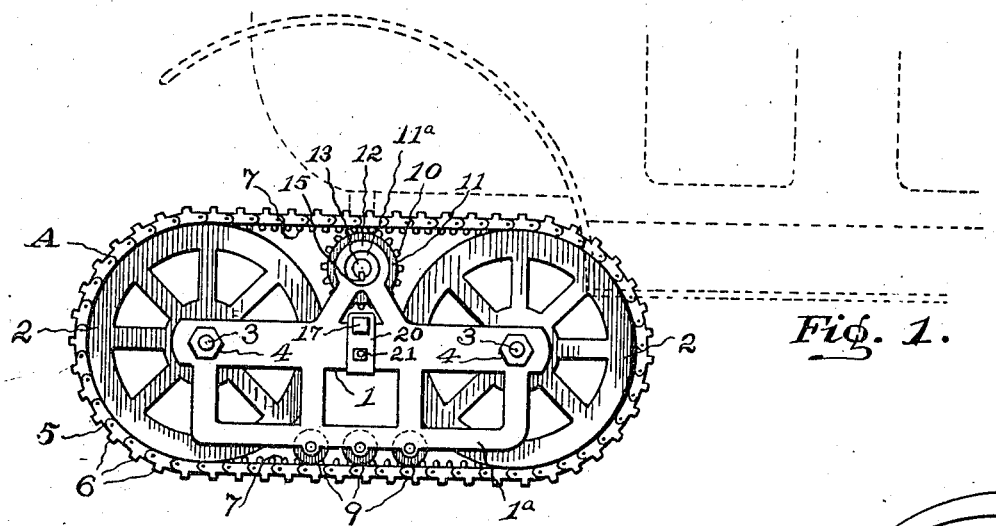
Fig. 1.
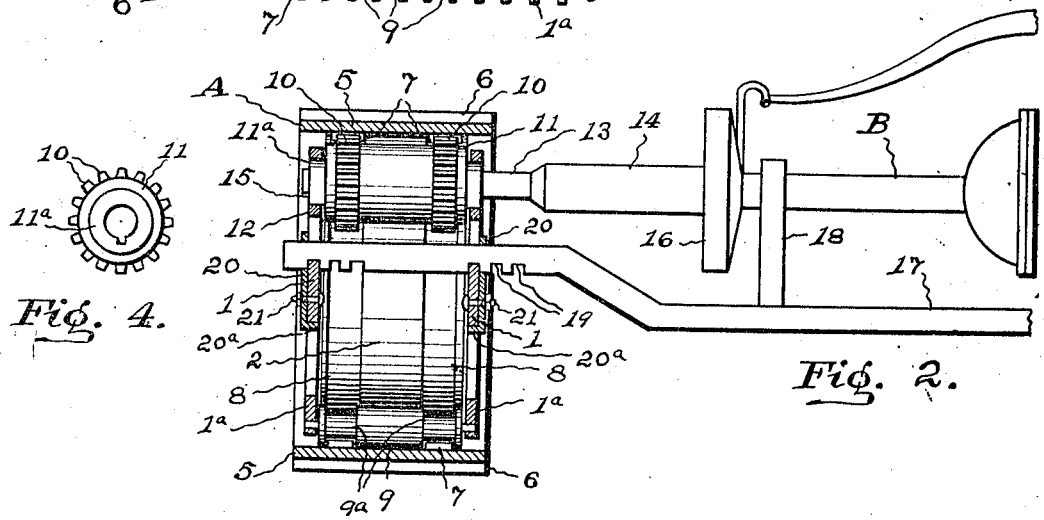
Fig. 4.
Fig. 2.
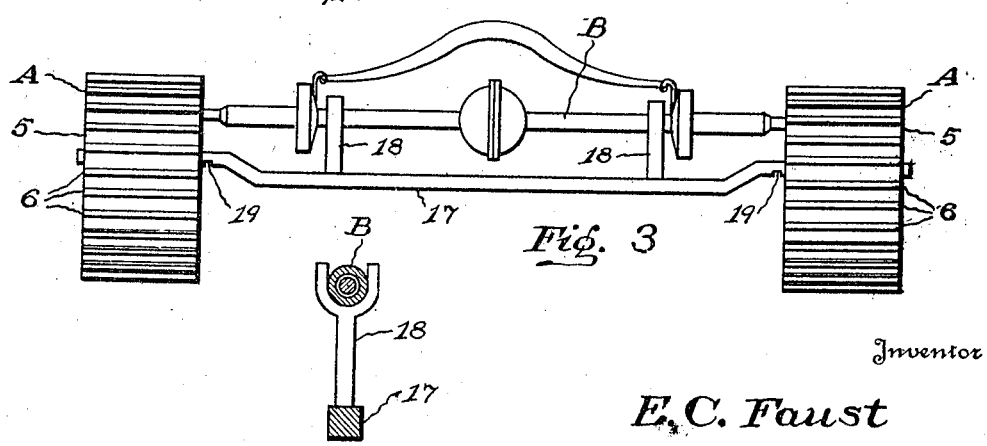
Fig. 3.
Fig. 5.
Inventor
E. C. Faust
By H. S. Hill
Attorney

UNITED STATES PATENT OFFICE.

EARL C. FAUST, OF DETROIT, MICHIGAN.

AUTOMOBILE TRACTOR ATTACHMENT.

1,292,286.  Specification of Letters Patent.  Patented Jan. 21, 1919.

Application filed April 29, 1918. Serial No. 231,392.

*To all whom it may concern:*

Be it known that I, EARL C. FAUST, a citizen of the United States, residing at Detroit, in the county of Wayne, State of Michigan, have invented a new and useful Automobile Tractor Attachment; and I do hereby declare the following to be a full, clear, and exact description of the invention, such as will enable others skilled in the art to which it appertains to make and use the same.

The present invention relates to a tractor attachment for automobiles, and has for its object to provide a device of this character which embodies novel features of construction whereby a tractor attachment of the caterpillar type can be readily applied to an automobile, thereby converting the same into a powerful tractor.

Further objects of the invention are to provide a tractor attachment of this character which is comparatively simple and inexpensive in its construction, which can be readily applied to an automobile or removed therefrom, and which provides a rigid support for the rear axle of the automoblie, thereby relieving the axle of any possible abnormal strain.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a tractor attachment constructed in accordance with the invention, fragmentary portions of the rear end of an automobile to which it is applied being indicated by dotted lines.

Fig. 2 is a transverse vertical sectional view through the tractor attachment, showing portions of the rear axle of the automobile to which the attachment is applied.

Fig. 3 is a rear view of the tractor attachment and the rear axle of the automobile.

Fig. 4 is an enlarged end view of the toothed sleeve which is utilized for driving the endless tread.

Fig. 5 is an enlarged vertical sectional view through the cross bar of the attachment and the vehicle axle, showing one of the forked props for supporting the vehicle axle.

Corresponding and like parts are referred to in the following description and indicated in all the views of the drawings by the same reference characters.

The attachment includes two caterpillar tractor units A which are identical in construction, one of the units being arranged upon each side of the automobile and each unit being driven from the axle of the automobile by means of an extension applied to the axle. The units A each include a pair of spaced vertical side frames 1 which have the drums 2 journaled between opposite ends thereof, said drums being mounted upon axles 3 which connect the side frames 1 and are shown as capped by the nuts 4. The endless and jointed tread 5 extends around the two drums 2, the outer surface of the tread being formed with transverse ribs 6 which act as mud hooks to insure proper traction, while the inner surface of the tread is provided with two rows of teeth 7. The drums 2 are formed with peripheral channels 8 which receive the teeth 7 and coöperate with the teeth to prevent lateral displacement of the endless tread upon the drums.

The lower reach of the endless tread 5 stretches horizontally between the lower sides of the drums 2 and operates in the well-known manner to engage the ground over which the tractor is traveling, obtaining an extended bearing surface thereon which enables a heavy weight to be supported and at the same time insures sufficient traction being obtained to move the superposed load. This lower reach of the endless tread 5 may be engaged at the top thereof by rollers 9, said rollers being journaled between downward extensions 1ª of the side frames 1, and being grooved at 9ª to provide a clearance space for the teeth 7 of the endless tread. These rollers 9 provide a firm backing for the lower reach of the endless tread, and hold the same in a firm engagement with the ground or surface over which the tractor is traveling.

The teeth 7 projecting from the upper reach of the endless tread 5 are engaged by the two peripheral rows of teeth 10 upon a drive sleeve 11, the extremities of the sleeve being formed with reduced portions which are journaled within bearings 12 provided in upward extensions of the side frames 1. Spindles 13 at the ends of axle extensions 14 fit removably in the drive sleeve 11, having a keyed connection therewith, as indicated at 15.

The axle extensions 14 are fitted upon the ends of the vehicle axle as a substitute for the drive wheels which are removed from the axle when the tractor attachment is applied to the vehicle. A conventional automobile axle is indicated at B, and the extensions 14 are substituted for the regular drive wheels, said extensions being provided with brake drums 16 which are engaged by the regular brake bands, thereby enabling the brake mechanism of the vehicle to be used in connection with the tractor.

The use of the axle extensions 14 and spindles 13 enables the units A of the tractor attachment to be positioned sufficiently far on each side of the vehicle as not to interfere in any manner with the rear mud guards and running boards. A cross beam 17 connects the two units A of the attachment and extends under the automobile axle B, being provided with upwardly extending forked props 18 which engage the axle B of the automobile, thereby transmitting all of the load from the axle to the cross beam and relieving the axle of any possible excessive or abnormal strain when the tractor attachment is in use. The ends of the cross beam 17 are firmly connected to the tractor units A, being shown in the present instance as extending across the upper edges of the side frames A, and as provided with a series of notches 19, any selected set of which can be brought into an interlocking connection with the edges of the side frames. The tractor units A thus have a limited adjustment toward and away from the side of the vehicle to which the attachment is applied. Locking plates 20 are provided for holding the ends of the beam 17 in an interlocking engagement with the side frames 1 of the units. These plates are perforated at their upper ends to receive the cross beam, while the lower ends thereof are flanged at 20ª to fit under the lower edges of the side frames. Suitable fastening members such as the bolts 21 hold the locking plates in an adjusted position, and it will be obvious that when the locking plates are in position the units A of the attachment will be held in a firm engagement with the cross beam 17. The device can be readily applied to an automobile as an attachment, thereby enabling the automobile to be used in places where a powerful tractor is needed. At the same time, the attachment can be removed and the regular vehicle wheels replaced upon the axle of the automobile when it is desired to use the latter as a road vehicle. The cross beam 17 receives the load from the automobile axle B and transfers the same to the two tractor units A, and as has been previously explained, this construction avoids the possibility of an excessive strain being placed upon the axle, even though a heavy load may be carried.

Having thus described the invention, what I claim as new and desire to secure by Letters Patent, is:—

1. A tractor attachment for automobiles, including a frame, a pair of drums journaled upon the frame, a jointed endless tread extending around the drums and provided upon its inner face with a plurality of sets of teeth, rollers journaled upon the frame and engaging the lower reach of the tread to hold it in operative position, the rollers and drums being grooved to receive the teeth of the tread and the grooved portions coöperating with the teeth to hold the tread against lateral displacement, a toothed driving sleeve journaled on the frame and meshing with the teeth of the upper reach of the tread, and a driving connection between the sleeve and the automobile axle.

2. A tractor attachment for automobiles, including a pair of units each formed with side plates, a driving connection between the said units and the automobile axle, a cross beam extending under the automobile axle and having the ends thereof notched to interlock with the side plates of the units, and supporting means on the cross beam for engaging the automobile axle.

3. A tractor attachment for automobiles, including a pair of units each formed with side plates, a driving connection between the said units and the automobile axle, a cross beam extending under the automobile axle and having the ends thereof notched to interlock with the side plates, locking plates secured to the side plates and engaging the cross beams to hold it in position, and supporting means on the cross beam for engaging the axle of the automobile.

In testimony whereof I have signed my name to this specification in the presence of two subscribing witnesses.

EARL C. FAUST.

Witnesses:
  D. L. ANDERSON,
  A. C. CORRELL.